US012741251B2

(12) United States Patent
Hiramatsu et al.

(10) Patent No.: US 12,741,251 B2
(45) Date of Patent: Sep. 22, 2026

(54) ULTRASONIC ATOMIZING DEVICE

(71) Applicant: TOSHIBA MITSUBISHI-ELECTRIC INDUSTRIAL SYSTEMS CORPORATION, Tokyo (JP)

(72) Inventors: Takahiro Hiramatsu, Tokyo (JP); Hiroyuki Orita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 295 days.

(21) Appl. No.: 18/712,484

(22) PCT Filed: Oct. 17, 2022

(86) PCT No.: PCT/JP2022/038553
§ 371 (c)(1),
(2) Date: May 22, 2024

(87) PCT Pub. No.: WO2024/084545
PCT Pub. Date: Apr. 25, 2024

(65) Prior Publication Data
US 2025/0001370 A1 Jan. 2, 2025

(51) Int. Cl.
*B01F 23/21* (2022.01)
*B01F 23/213* (2022.01)
(Continued)

(52) U.S. Cl.
CPC ...... *B01F 23/2133* (2022.01); *B01F 35/2112* (2022.01); *B01F 35/2211* (2022.01); *B01F 35/7176* (2022.01); *B05B 17/0615* (2013.01)

(58) Field of Classification Search
CPC .................................................. B01F 23/2133
See application file for complete search history.

(56) References Cited

U.S. PATENT DOCUMENTS

2017/0066003 A1 3/2017 Baumgartner et al.

FOREIGN PATENT DOCUMENTS

JP S53-41807 A 4/1978
JP H11-123356 A 5/1999
(Continued)

OTHER PUBLICATIONS

International Search Report and Written Opinion mailed on Nov. 22, 2022, received for International Patent Application No. PCT/JP2022/038553, filed on Oct. 17, 2022, 9 pages including English Translation.

(Continued)

*Primary Examiner* — Robert A Hopkins
(74) *Attorney, Agent, or Firm* — XSENSUS LLP

(57) ABSTRACT

In an ultrasonic atomizing device of the present disclosure, a raw material solution separation pipe is provided on a side surface of an atomization container. The raw material solution separation pipe has a raw material solution storage space for storing the raw material solution, and a raw material solution passage port for supplying and discharging the raw material solution to and from the raw material solution container. A liquid surface detection unit is provided in the vicinity of the raw material solution separation pipe. The liquid surface detection unit detects the level of the liquid level of the raw material solution in the raw material solution storage space, and outputs a liquid surface detection signal indicating the level of the detected liquid level.

6 Claims, 8 Drawing Sheets

(51) Int. Cl.

| | |
|---|---|
| ***B01F 35/21*** | (2022.01) |
| ***B01F 35/221*** | (2022.01) |
| ***B01F 35/71*** | (2022.01) |
| ***B05B 17/06*** | (2006.01) |

(56) References Cited

FOREIGN PATENT DOCUMENTS

| | | | | |
|---|---|---|---|---|
| JP | 2009034586 | A | * | 2/2009 |
| JP | 2020-054962 | A | | 4/2020 |
| JP | 2021-123890 | A | | 8/2021 |
| JP | 6987481 | B1 | | 1/2022 |
| KR | 2022-0038886 | A | | 3/2022 |
| WO | 2015/019468 | A1 | | 2/2015 |

OTHER PUBLICATIONS

Notice of Reason for Refusal mailed on Feb. 27, 2024, received for JP Application 2023-517938, 8 pages including English Translation.

Office Action issued on Jan. 8, 2026, in corresponding Korean patent Application No. 10-2024-7015463, 14 pages.

International Preliminary Report on Patentability (Chapter I) mailed on May 1, 2025, in corresponding PCT/JP2022/038553, 12 pages.

Office Action issued on Feb. 16, 2026, in corresponding German patent Application No. 112022004593.0, 15 pages.

* cited by examiner

ULTRASONIC ATOMIZING DEVICE

CROSS-REFERENCE TO RELATED APPLICATION

This application is a national stage application, pursuant to 35 U.S.C. § 371, of International Patent Application No. PCT/JP2022/038553, filed Oct. 17, 2022, the entire contents of which are incorporated herein by reference.

TECHNICAL FIELD

The present disclosure relates to an ultrasonic atomizing device that atomizes a raw material solution into fine mists using an ultrasonic transducer to obtain a raw material solution mist.

BACKGROUND ART

An ultrasonic atomizing device is used at working sites of manufacturing electronic devices. In the field of electronic device manufacturing, an ultrasonic atomizing device atomizes a solution (to a mist) using ultrasonic waves oscillated by an ultrasonic transducer, and the atomized raw material solution mist is sent by a transport gas outside. A thin film for an electronic device is formed on a substrate by spraying the raw material solution mist conveyed to the outside from a nozzle or the like onto the substrate. As such a conventional ultrasonic atomizing device, an atomizing device disclosed in Patent Document 1, has been known, for example.

As described above, the conventional ultrasonic atomizing device generates the raw material solution mist by applying ultrasonic vibration to the raw material solution. The amount of mist (atomized solution) supplied (discharged) from the ultrasonic atomizing device varies (increases or decreases) depending on the flow rate of the transport gas used to convey the raw material solution mist from the ultrasonic atomizing device to the outside.

Meanwhile, to reliably produce thin films using the raw material solution mist, stabilizing the amount of mist of the row material solution mist supplied from the ultrasonic atomizing device and making the gas flow rate containing the mist constant are required. Note that the term "amount of mist" refers specifically to the mass or total volume of the raw material solution mist per unit time. Therefore, the units for the amount of mist are expressed as "mg/see" or "ml/see" and so on.

FIG. 8 is an explanatory diagram that schematically illustrates a configuration of a conventional ultrasonic atomizing device 200. The configuration of the ultrasonic atomizing device 200 will be described below with reference to FIG. 8.

In the conventional ultrasonic atomizing device 200, an atomization container 71 and a separator cup 82 constitute a raw material solution container. The bottom surface of the raw material solution container serves as the separator cup 82. The raw material solution container stores a raw material solution 15 therein.

A pipe portion 71A is provided above the separator cup 82 in communication with the upper portion of the atomization container 71. The pipe portion 71A is connected to a nozzle 17 through a mist supply pipe 5. A raw material solution mist MT generated in the raw material solution container is supplied to the nozzle 17 through the pipe portion 71A and the mist supply pipe 5.

In the ultrasonic atomizing device 200, a water tank 80 storing ultrasonic transmission water 9 serving as an ultrasonic transmission medium is further included. The water tank 80 and the separator cup 82 are positioned so that the bottom surface of the separator cup 82 is submerged in the ultrasonic transmission water 9.

A plurality of ultrasonic transducers 2 are provided on the bottom surface of water tank 80. Two ultrasonic transducers 2 are illustrated in FIG. 8. Each of the plurality of ultrasonic transducers 2 has an ultrasonic diaphragm 27, and each ultrasonic transducer 2 performs ultrasonic vibration in which an ultrasonic wave W2 of the size same as the planar shape of the ultrasonic diaphragm 27 from the ultrasonic diaphragm 27.

A gas supply pipe 4 is provided on the upper side surface of the atomization container 71, and a transport gas G4 is supplied from the gas supply pipe 4. A flow control unit 54 and valves 63 and 64 on both sides of the flow control unit 54 are attached to the gas supply pipe 4.

The flow control unit 54 includes a flow meter, and controls the throttling opening degrees of the valves 63 and 64 so that the flow rate of the transport gas G4 flowing through the gas supply pipe 4 becomes a set flow rate. The gas control device including the flow control unit 54 and the valves 63 and 64 controls the flow rate of transport gas G4 to be supplied to atomization container 71.

A gas supply pipe 3 is provided on the side surface of the pipe portion 71A, and a dilution gas G3 is supplied from the gas supply pipe 3. A flow control unit 53 and valves 61 and 62 on both sides of the flow control unit 53 are attached to the gas supply pipe 3.

The flow control unit 53 includes a flow meter, and controls the throttling opening degrees of the valves 61 and 62 so that the flow rate of the dilution gas G3 flowing through the gas supply pipe 3 becomes a set flow rate. The gas control device including the flow control unit 53 and the valves 61 and 62 controls the flow rate of dilution gas G3 to be supplied to pipe portion 71A.

As described above, the raw material solution 15 is stored in the raw material solution container constituted by the atomization container 71 and the separator cup 82. The bottom surface of the raw material solution container serves as the separator cup 82.

Furthermore, a liquid surface detection unit 19 for detecting the position of the liquid surface 15A of the raw material solution 15 is provided in the raw material solution container.

Also, a raw material tank 35 is provided independently of the raw material solution container, and the raw material tank 35 accommodates therein the raw material solution 15 to be supplied to the raw material solution container. A raw material solution supply pipe 31 is provided between the raw material solution container and the raw material tank 35.

The raw material solution supply pipe 31 is provided with a suction pump 32 and a flow meter 33, and the raw material solution 15 in the raw material tank 35 is suppled through the raw material solution supply pipe 31 at a predetermined flow rate by the suction pump 32 to the raw material solution container.

Whereas, the mist supply pipe 5 is connected to the nozzle 17, and the bottom surface of the nozzle 17 is provided with an unillustrated opening. Below the nozzle 17, for example, a substrate 18 to be subjected to film-forming is arranged.

In the ultrasonic atomizing device 200 having such a configuration, when ultrasonic vibrations are applied from the plurality of ultrasonic transducers 2 each having an ultrasonic diaphragm 27, the vibrational energy of the ultrasonic waves W2 from the plurality of ultrasonic transducers 2 is transmitted through the ultrasonic transmission water 9 and the separator cup 82 to the raw material solution 15 in the raw material solution container.

Then, as illustrated in FIG. 8, liquid columns 6 rise from the liquid surface 15A, and the raw material solution 15 transforms into droplets and into mist, thereby obtaining the raw material solution mist MT in the atomization container 71. By applying the ultrasonic waves W2 from the ultrasonic transducers 2 in this manner, the atomization operation of atomizing the raw material solution 15 to generate the raw material solution mist MT is executed.

The raw material solution mist MT generated in the atomization container 71 during execution of the atomization operation is supplied to the nozzle 17 through the pipe portion 71A and the mist supply pipe 5 by the transport gas G4 supplied from the gas supply pipe 4 and the dilution gas G3 supplied from the gas supply pipe 3.

The raw material solution mist MT supplied to the nozzle 17 is ejected onto the surface of the substrate 18 from the opening provided in the bottom surface of the nozzle 17, thereby forming a thin film on the surface of the substrate 18 in a heated state.

PRIOR ART DOCUMENTS

Patent Document(s)

[Patent Document 1] International Publication No. 2015/019468

SUMMARY

Problem to be Solved by the Invention

As described above, the gas system connected to the conventional ultrasonic atomizing device 200 consists of two lines: for the transport gas G4 and for the dilution gas G3. The dilution gas G3 is a gas for making the total gas amount of the raw material solution mist MT ejected from the nozzle 17 constant. Therefore, gas control devices including flowmeters (flow control units) and valves required for gas flow rate control requires two lines, resulting in an increase in the manufacturing cost of the devices. Specifically, the flow control unit 53 and the valves 61 and 62 illustrated in FIG. 8 are required as the gas control device for the dilution gas G3, and the flow control unit 54 and the valves 63 and 64 illustrated in FIG. 8 are required as the gas control device for the transport gas G4.

The raw material solution mist MT generated in the atomization container 71 by ultrasonic vibration is supplied to the pipe portion 71A, the mist supply pipe 5, and the nozzle 17 outside the atomization container 71 by the dilution gas G3 and the transport gas G4. When the raw material solution mist MT generated in the atomization container 71 is kept constant, the amount of mist of the raw material solution mist MT supplied from the atomization container 71 can be increased or decreased by the transport gas flow rate LC of the transport gas G4.

Meanwhile, forming a thin film using the raw material solution mist MT requires maintain a constant total gas flow rate LT of the raw material solution mist MT in addition to a stable amount of mist. The constant total gas flow rate LT can make the constant ejection velocity of the raw material solution mist MT ejected from the opening of the nozzle 17. The opening of nozzle 17 is designed, for example, in a slit shape.

Meanwhile, when the transport gas flow rate LC is increased or decreased in order to control the mist supply amount of the raw material solution mist MT, the total gas flow rate LT is increased or decreased accordingly.

Therefore, in order to keep the total gas flow rate LT constant, as illustrated in FIG. 8, it is necessary to supply the dilution gas G3, which is the line different from that of the transport gas G4, to the pipe portion 71A near the atomization container 71. Here, assuming that the gas flow rate of the dilution gas G3 is a dilution gas flow rate LD, the relationship between the transport gas flow rate LC, the dilution gas flow rate LD, and the total gas flow rate LT is defined by the following equation (1).

$$LT=LC+LD \qquad (1)$$

The transport gas flow rate LC, dilution gas flow rate LD, and total gas flow rate LT is represented by the volume per unit time, and are represented in units such as "1 (liter)/min".

For example, when the transport gas flow rate LC is decreased by ΔLC in order to reduce the mist supply amount of the raw material solution mist MT, the total gas flow rate LT can be kept more constant than when increasing the dilution gas flow rate LD by ΔLC.

Thus, the conventional ultrasonic atomizing device 200 can keep the total gas flow rate LT constant regardless of changes in the transport gas flow rate LC by adding the dilution gas line for the dilution gas G3.

However, as described above, there has been a problem that addition of one line of a gas control device such as flowmeters (flow control unit) and valves required for gas control of dilution gas G3 leads to the additional device manufacturing cost as a result.

Also, in the conventional ultrasonic atomizing device 200, the ultrasonic waves W2 generated by the ultrasonic transducers reach the raw material solution 15 through the ultrasonic transmission water 9 and the separator cup 82, and further raise the liquid surface 15A of the raw material solution 15, which is the interface with the air, thereby generating the raw material solution mist MT from the tips thereof.

The generated raw material solution mist MT is pushed out toward the pipe portion 71A by the transport gas G4, and the liquid surface 15A of the raw material solution 15 is lowered, when the liquid surface detection unit 19 detects a drop in the liquid surface 15A, the suction pump 32 is driven to suck the raw material solution 15 from the raw material tank 35, thereby replenishing the raw material solution 15 into the raw material solution container.

However, the liquid surface 15A is greatly disturbed by the liquid columns 6 of the raw material solution 15, which are pushed up by ultrasonic waves W2; therefore, there has been a problem that the accurate measurement of the level of the liquid surface 15A is practically difficult.

An object of the present disclosure is to solve the above problems and to provide an ultrasonic atomizing device in which the liquid level of a raw material solution is detected with high accuracy.

Means to Solve the Problem

An ultrasonic atomizing device according to the present disclosure includes a raw material solution container for storing a raw material solution, an ultrasonic transducer provided below the raw material solution container, and a raw material solution separation pipe provided on a side surface of the raw material solution container and has a raw material solution storage space for storing the raw material solution, in which the raw material solution separation pipe has a raw material solution passage port for supplying and discharging the raw material solution to and from the raw material solution container, and the ultrasonic atomizing device further includes a liquid surface detection unit configured to detect a liquid level of the raw material solution in the raw material solution storage space.

Effects of the Invention

The liquid surface detection unit in the ultrasonic atomizing device of the present disclosure detects the liquid level of the raw material solution in the raw material solution storage space. The raw material solution in the raw material solution container is in an unstable state due to the oscillation of an ultrasonic wave from an ultrasonic transducer. Meanwhile, the raw material solution storage space is formed in the raw material solution separation pipe provided on the side surface of the raw material solution container; therefore, the liquid surface of the raw material solution is stable without being subjected to the ultrasonic wave from the ultrasonic transducer.

As described above, the liquid surface detection unit in the ultrasonic atomizing device of the present disclosure detects the raw material solution in the raw material solution storage space, so that the liquid level of the raw material solution can be detected with high accuracy.

The objects, features, aspects, and advantages of the present disclosure will become more apparent from the following detailed description and the accompanying drawings.

DESCRIPTION OF EMBODIMENT(S)

Principle of Present Disclosure

In the ultrasonic atomizing device of the present disclosure, the gas line system, which determines the total gas flow rate LT of the raw material solution mist MT, is changed from the conventional two-line system (transport gas G4 and dilution gas G3) to one-line system (transport gas G4 only). Adopting the one-line system for the gas line system enables to reduce the number of gas control devices required for gas control of the dilution gas G3, reducing the device manufacturing cost. In this case, the relationship between the transport gas flow rate LC and the total gas flow rate LT is {LT=LC}.

Meanwhile, there has been a problem that, when the increase or decrease in the amount of atomized solution of the raw material solution mist MT is controlled by the transport gas flow rate LC alone, the total gas flow rate LT cannot be kept constant.

As a measure to solve the problem, in the ultrasonic atomizing device of the present disclosure, the liquid level d15, which is the height from the surface of the ultrasonic diaphragm 27 in the ultrasonic transducer 2 to the liquid surface 15A of the raw material solution 15, is changed to control the amount of mist of the raw material solution mist MT. That is, by deliberately changing the liquid level d15 without changing the transport gas flow rate LC, the amount of mist of the raw material solution mist MT is increased or decreased.

EMBODIMENT

Figure 1:
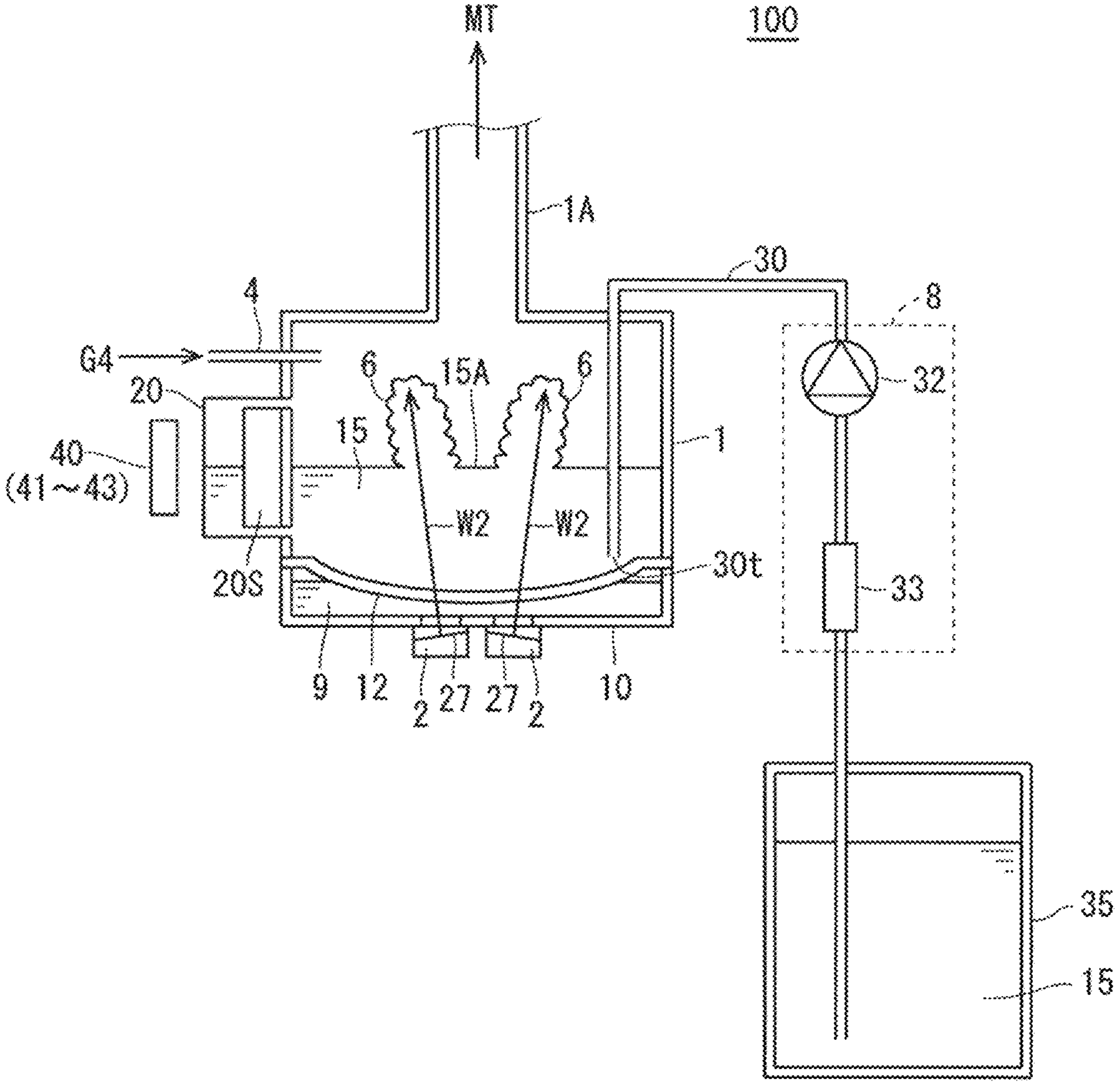
FIG. 1 An explanatory diagram schematically illustrating a configuration of an ultrasonic atomizing device according to an embodiment of the present disclosure.
Figure 2:
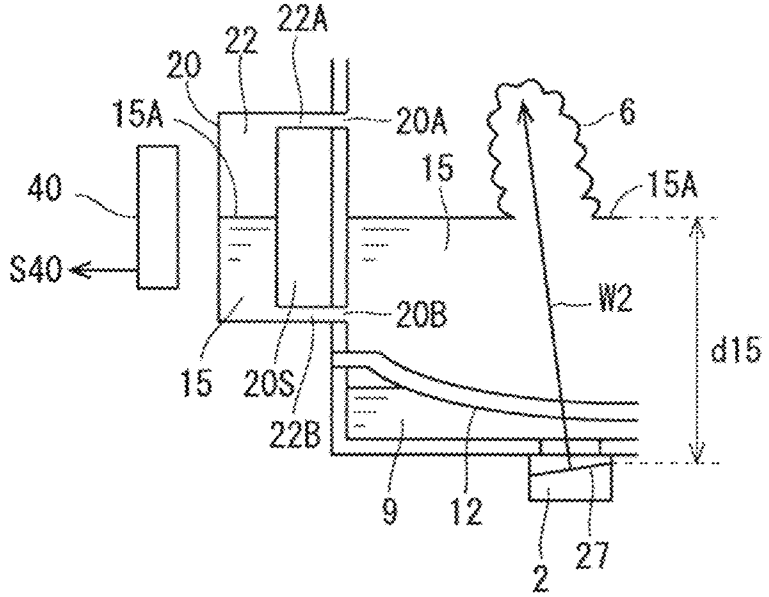
FIG. 2 An explanatory diagram illustrating a configuration of a raw material solution separation pipe and around thereof illustrated in FIG. 1.

FIG. 1 is an explanatory diagram that schematically illustrates a configuration of an ultrasonic atomizing device 100 according to an embodiment of the present disclosure. FIG. 2 is an explanatory diagram illustrating a configuration of a raw material solution separation pipe 20 and around thereof illustrated in FIG. 1. The configuration of the ultrasonic atomizing device 100 will be described below with reference to FIG. 1 and FIG. 2.

In the ultrasonic atomizing device 100 of the embodiment, an atomization container 1 and a separator 12 constitute a raw material solution container. The bottom surface of the raw material solution container serves as the separator 12. Accordingly, the raw material solution 15 is contained in the raw material solution container constituted by the atomization container 1 and the separator 12.

A pipe portion 1A is provided above the separator 12 in communication with the upper portion of the atomization container 1. The pipe portion 1A is connected to a mist injection portion such as an unillustrated nozzle and the like through an unillustrated mist supply pipe. A raw material solution mist MT generated in the raw material solution container is supplied to the nozzle and the like through the pipe portion 1A and the mist supply pipe.

Figure 8:
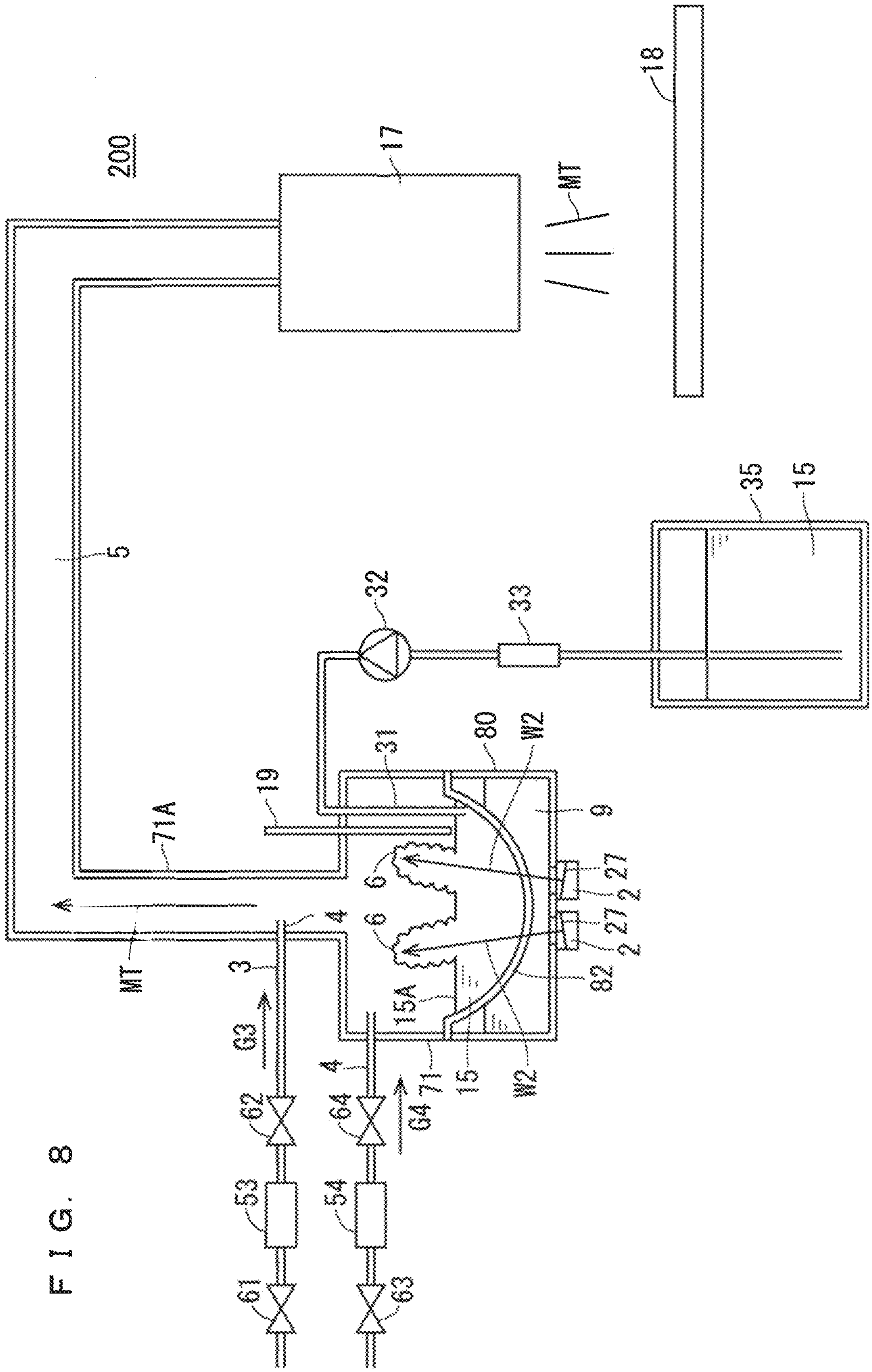
FIG. 8 An explanatory diagram schematically illustrating a configuration of a conventional ultrasonic atomizing device.

The unillustrated mist supply pipe corresponds to, for example, the mist supply pipe 5 illustrated in FIG. 8, and the mist injection portion such as an unillustrated nozzle corresponds to, for example, the nozzle 17 illustrated in FIG. 8.

In the ultrasonic atomizing device 100, a water tank 10 storing ultrasonic transmission water 9 serving as an ultrasonic transmission medium is further included. The water tank 10 and the separator 12 are positioned so that the bottom surface of the separator 12 is submerged in the ultrasonic transmission water 9.

A plurality of ultrasonic transducers 2 are provided on the bottom surface of water tank 10. Two ultrasonic transducers 2 are illustrated in FIG. 1. Each of the plurality of ultrasonic transducers 2 has an ultrasonic diaphragm 27, and each ultrasonic transducer 2 performs ultrasonic vibration in which an ultrasonic wave W2 of the size same as the planar shape of the ultrasonic diaphragm 27 from the ultrasonic diaphragm 27.

A gas supply pipe 4 is provided on the upper side surface of the atomization container 1, and a transport gas G4 is supplied from the gas supply pipe 4. An unillustrated gas control device is attached to the gas supply pipe 4, and the flow rate of the transport gas G4 to be supplied to the atomization container 1 is controlled by the gas control device. The gas control device corresponds to, for example, the flow control unit 54 and the valves 63 and 64 illustrated in FIG. 8.

As described above, the raw material solution 15 is accommodated in the raw material solution container constituted by the atomization container 1 and the separator 12. The bottom surface of the raw material solution container serves as the separator 12.

Furthermore, a raw material tank 35 is provided independently of the raw material solution container including the atomization container 1 and the separator 12.

The raw material tank 35 stores therein the raw material solution 15 to be supplied to the raw material solution container. A raw material solution pipe 30 is provided between the raw material solution container and the raw material tank 35. The raw material solution 15 can be circulated between the raw material solution container and the raw material tank 35 through the raw material solution pipe 30.

A raw material solution increasing/decreasing mechanism 8 including a suction pump 32 and a flow meter 33 is provided in the raw material solution pipe 30. The raw material solution increasing/decreasing mechanism 8 executes a raw material solution supply operation for supplying the raw material solution 15 stored in the raw material tank 35 into the raw material solution container under the control of the control unit 50, which will be described later, and a raw material solution discharge operation for discharging the raw material solution 15 stored in the raw material solution container to the raw material tank 35.

Hereinafter, the raw material solution separation pipe 20 and the liquid surface detection unit 40 will be described with reference to FIG. 2. The raw material solution separation pipe 20 is provided on the side surface of the atomization container 1 and has a raw material solution storage space 22 for storing the raw material solution 15.

The raw material solution separation pipe 20 has a raw material solution passage port 20B for supplying and discharging the raw material solution 15 to and from the raw material solution container. The forming position of the raw material solution passage port 20B in the height direction is set above the separator 12 and below the assumed lowest level of the liquid surface 15A. The opening area of the raw material solution passage port 20B should be an area enough for the raw material solution 15 to pass through without obstruction.

Further, an opening 20A is provided above the raw material solution separation pipe 20 to communicate the raw material solution storage space 22 with the space inside the atomization container 1. The forming position of the opening 20A in the height direction is set above the assumed highest level of the liquid surface 15A.

Further, a side space 20S is provided between the side surface of the raw material solution separation pipe 20 and the side surface of the atomization container 1.

Therefore, the raw material solution 15 flows between the raw material solution storage space 22 and the raw material solution container through the raw material solution passage port 20B and the relatively narrow raw material solution passage area 22B. Similarly, the gas component flows between the raw material solution storage space 22 and the raw material solution container through the opening 20A and the relatively narrow gas component passage area 22A.

Therefore, the raw material solution storage space 22 in the raw material solution separation pipe 20 is a space that is not subjected to the ultrasonic waves W2 from the plurality of ultrasonic transducers 2, unlike the raw material solution container. In this manner, the ultrasonic atomizing device 100 of the present embodiment separates and stores the raw material solution 15 in the raw material solution container and the raw material solution separation pipe 20.

A liquid surface detection unit 40 is provided in the vicinity of the raw material solution separation pipe 20. The liquid surface detection unit 40 detects the level of the liquid surface 15A of the raw material solution 15 in the raw material solution storage space 22, and outputs a liquid surface detection signal S40 indicating the detected level of the liquid surface 15A.

In the ultrasonic atomizing device 100 having such a configuration, when ultrasonic vibrations are applied from the plurality of ultrasonic transducers 2 each having an ultrasonic diaphragm 27, the vibrational energy of the ultrasonic waves W2 from the plurality of ultrasonic transducers 2 is transmitted through the ultrasonic transmission water 9 and the separator 12 to the raw material solution 15 in the raw material solution container.

Then, as illustrated in FIG. 1 and FIG. 2, liquid columns 6 rise from the liquid surface 15A, and the raw material solution 15 transforms into droplets and into mist, thereby obtaining the raw material solution mist MT in the atomization container 1. By applying the ultrasonic waves W2 from the ultrasonic transducers 2 in this manner, the atomization operation of atomizing the raw material solution 15 to generate the raw material solution mist MT is executed.

The raw material solution mist MT generated in the atomization container 1 during execution of the atomization operation is supplied to the mist injection portion such as the mist supply pipe, the nozzle, and the like through a pipe portion 1A by the transport gas G4 supplied from the gas supply pipe 4.

Then the raw material solution mist MT is ejected from the opening of the nozzle or the like on the surface of the substrate finally, thereby forming a thin film on the surface of the substrate in a heated state.

The liquid surface detection unit 40 in the ultrasonic atomizing device 100 of the present embodiment detects the level of the liquid surface 15A of the raw material solution 15 in the raw material solution storage space 22. The liquid surface 15A of the raw material solution 15 in the raw material solution container is in an unstable state since the liquid columns 6 and the like are generated as the ultrasonic waves W2 are oscillated from the plurality of ultrasonic transducers 2. Meanwhile, the raw material solution storage space 22 is formed in the raw material solution separation pipe 20 provided on the side surface of the raw material solution container: therefore, the liquid surface 15A of the raw material solution 15 in the raw material solution storage space 22 is stable without being subjected to the ultrasonic waves W2 from the plurality of ultrasonic transducers 2.

As described above, the liquid surface detection unit 40 in the ultrasonic atomizing device 100 of the present embodiment targets the raw material solution 15 in the raw material solution storage space 22 as the subject for detection; therefore, the liquid level d15 being from the ultrasonic diaphragm 27 to the liquid surface 15A is detected with high accuracy.

As the liquid surface detection unit 40, for example, a liquid surface detection unit 41 using a guide pulse method, a liquid surface detection unit 42 using a float sensor method, or a liquid surface detection unit 43 using an electrostatic capacitance method can be conceived.

Figure 3:
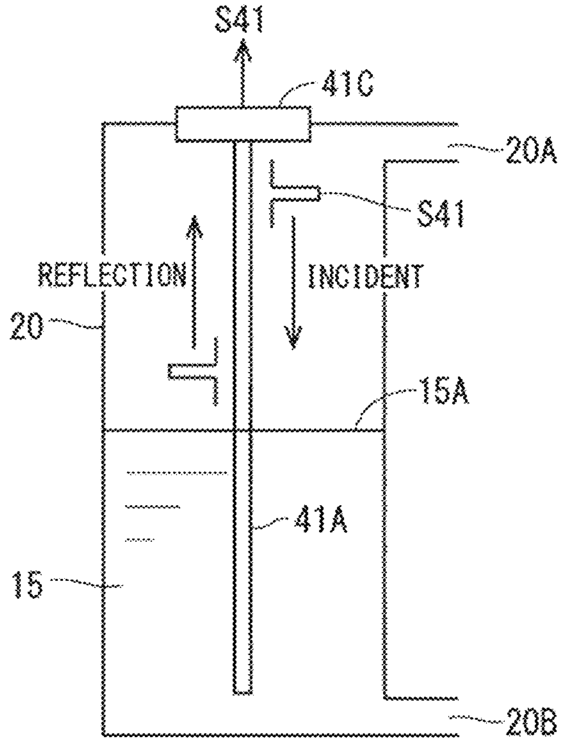
FIG. 3 An explanatory diagram illustrating a configuration of a liquid surface detection unit using a guide pulse method.

FIG. 3 is an explanatory diagram illustrating a configuration of the liquid surface detection unit using the guide pulse method. As illustrated in FIG. 3, the liquid surface detection unit 41 includes a guide probe 41A and a sensor 41C as main components.

The guide probe 41A is arranged in a manner as to extend in the height direction in the raw material solution storage space 22 of the raw material solution separation pipe 20. The sensor 41C applies a pulsed electric signal to the guide probe 41A, and outputs the liquid surface detection signal S41 on the basis of a reflected signal from the liquid surface 15A of the raw material solution 15 in the raw material solution storage space 22. The liquid surface detection signal S41 is to be a signal indicating the liquid level d15.

A liquid surface detection signal S41 output from the sensor 41C of the liquid surface detection unit 41 is obtained by the guide pulse method. Therefore, regarding the liquid surface 15A of the raw material solution 15 in the raw material solution storage space 22, the liquid surface detection signal S41 can indicate the liquid level d15 from the ultrasonic diaphragm 27 of the ultrasonic transducer 2 with high accuracy.

Figure 4:
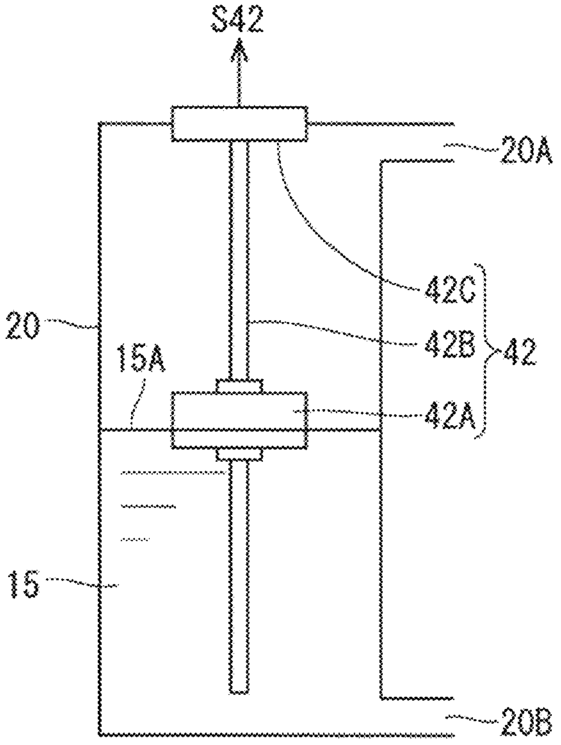
FIG. 4 An explanatory diagram illustrating a configuration of a liquid surface detection unit using a float sensor method.

FIG. 4 is an explanatory diagram illustrating a configuration of the liquid surface detection unit 42 using the float sensor method. As illustrated in FIG. 4, the liquid surface detection unit 41 includes a float 42A, a guide rod 42B, and a sensor 41C as main components.

The guide rod 42B is arranged in the raw material solution storage space 22 so as to extend in the height direction. The float 42A is attached to the guide rod 42B and vertically moves according to the level of the liquid surface 15A of the raw material solution 15 in the raw material solution storage space 22. A magnet is provided inside the float 42A.

The sensor 42C detects the position of the float 42A via the guide rod 42B and outputs a liquid surface detection signal S42. The liquid surface detection signal S42 is to be a signal indicating the liquid level d15.

Specifically, the sensor 42C activates a group of reed switches inside the guide rod 42B. A plurality of reed switches are provided along the height direction inside the guide rod 42B. Of the plurality of reed switches, one reed switch whose arrangement height is the same as that of the float 42A is turned on by the magnetic force of the magnet of the float 42A. Therefore, the sensor 42C detects the position that the float 42A is attached to the guide rod 42B from one of the plurality of reed switches that is in the ON state, thereby recognizing the liquid surface 15A of the raw material solution 15 in the raw material solution storage space 22.

A liquid surface detection signal S42 output from the sensor 42C is obtained by the float sensor method. Therefore, regarding the liquid surface 15A of the raw material solution 15 in the raw material solution storage space 22, the liquid surface detection signal S42 can indicate the liquid level d15 from the ultrasonic diaphragm 27 of the ultrasonic transducer 2 with high accuracy.

Figure 5:
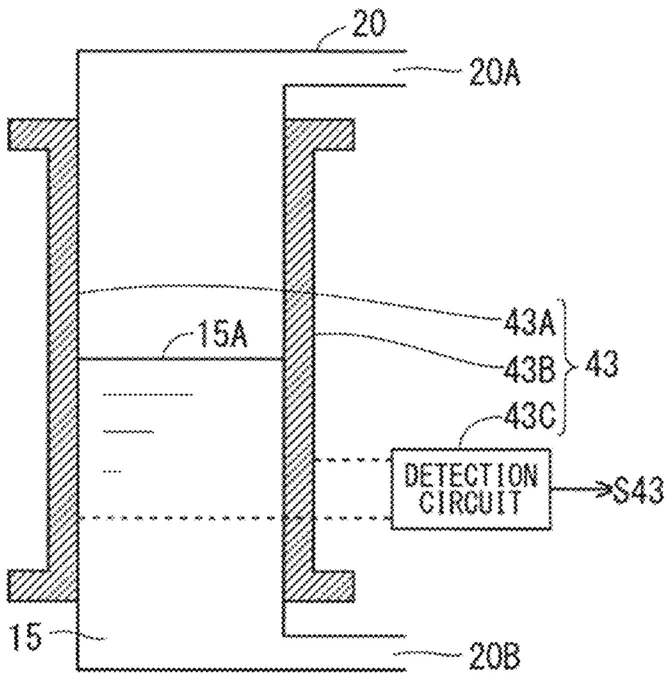
FIG. 5 An explanatory diagram illustrating a configuration of a liquid surface detection unit using an electrostatic capacitance method.

FIG. 5 is an explanatory diagram illustrating a configuration of the liquid surface detection unit 43 using the electrostatic capacitance method. As illustrated in FIG. 5, the liquid surface detection unit 43 includes a pair of electrodes 43A and 43B, and a detection circuit 43C as main components.

The pair of electrodes 43A and 43B are attached to the side surfaces of the raw material solution separation pipe 20 so as to face each other with the raw material solution storage space 22 interposed therebetween.

The detection circuit 43C is electrically connected to the pair of electrodes 43A and 43B and has an oscillation circuit and the like inside. The detection circuit 43C calculates the capacitance between the pair of electrodes 43A and 43B by an existing method, and outputs the liquid surface detection signal S43 based on the calculated capacitance. The liquid surface detection signal S43 is to be a signal indicating the liquid level d15.

A liquid surface detection signal S43 output from the detection circuit 43C is obtained by the electrostatic capacitance method. Therefore, regarding the liquid surface 15A of the raw material solution 15 in the raw material solution storage space 22, the liquid surface detection signal S43 can indicate the liquid level d15 from the ultrasonic diaphragm 27 of the ultrasonic transducer 2 with high accuracy.

Figure 6:
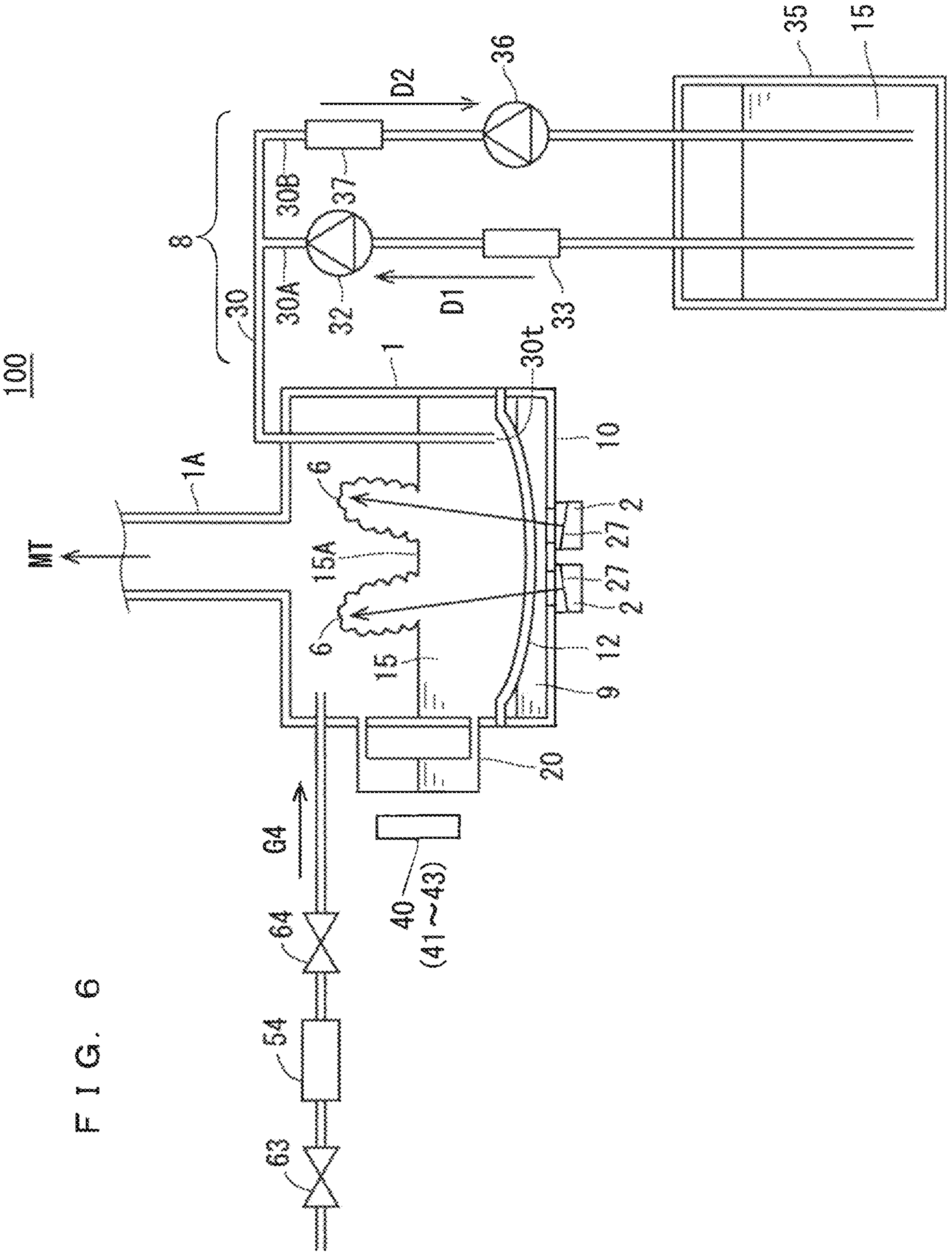
FIG. 6 An explanatory diagram illustrating details of a gas control device for a transport gas and a raw material solution increasing/decreasing mechanism in the ultrasonic atomizing device of the embodiment.

FIG. 6 is an explanatory diagram illustrating details of a gas control device for the transport gas 4 and the raw material solution increasing/decreasing mechanism 8 in the ultrasonic atomizing device 100.

As illustrated in FIG. 6, a flow control unit 54 and valves 63 and 64 on both sides of the flow control unit 54 are attached to the gas supply pipe 4. The gas control device is configured with the flow control unit 54 and the valves 63 and 64 as main components.

The flow control unit 54 includes a flow meter, and controls the throttling opening degrees of the valves 63 and 64 so that the flow rate of the transport gas G4 flowing through the gas supply pipe 4 becomes a set flow rate. The gas control device including the flow control unit 54 and the valves 63 and 64 controls the flow rate of transport gas G4 to be supplied to atomization container 1.

The ultrasonic atomizing device 100 of the present embodiment does not supply the dilution gas G3; therefore, no gas control device for the dilution gas G3 is required to be provided.

The raw material solution increasing/decreasing mechanism 8 includes a raw material solution pipe 30 (a raw material solution supply pipe 30A and a raw material solution discharge pipe 30B), a suction pump 32, a flow meter 33, a discharge pump 36, and a flow meter 37 as main components.

The raw material solution pipe 30 has a tip opening 30*t* at a position lower than the raw material solution passage port 20B in the raw material solution container.

The suction pump 32, which is a raw material solution supply pump, executes a raw material solution supply operation under the control of the control unit 50. The discharge pump 36, which is a raw material solution discharge pump, executes a raw material solution discharge operation under the control of the control unit 50. The suction pump 32 and the discharge pump 36 are provided independently of each other.

Figure 7:
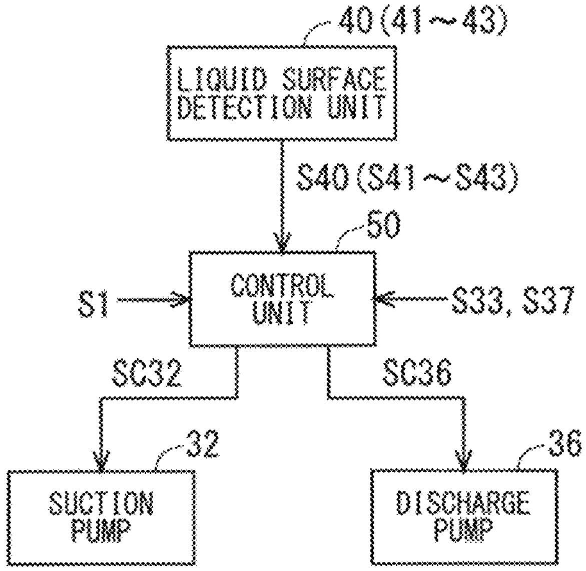
FIG. 7 An explanatory diagram illustrating a control system of the ultrasonic atomizing device according to the embodiment.

FIG. 7 is an explanatory diagram illustrating a control system of the ultrasonic atomizing device 100 according to the embodiment. As illustrated in FIG. 7, the control unit 50 receives the liquid surface detection signal S40 from the liquid surface detection unit 40. The liquid surface detection unit 40 includes the liquid surface detection units 41 to 43, and the liquid surface detection signal S40 includes the liquid surface detection signals S41 to S43.

Also, the control unit 50 receives a setting signal S1 from the outside. As the setting signal S1, for example, a signal directly instructing a liquid level such as the optimum liquid level do at which the amount of mist of the raw material solution mist MT is made maximum, or a signal instructing the amount of mist, or the like can be conceived.

When the setting signal S1 is a signal instructing the amount of mist, the control unit 50 calculates the liquid level d15 at which the instructed amount of mist can be generated as the set liquid level d50. When the setting signal S1 is a signal instructing the liquid level per se, the control unit 50 recognizes the instructed liquid level as the set liquid level d50. The set liquid level d50 represents the "predetermined level" that is the control target of the control unit 50.

The control unit 50 controls the raw material solution increasing/decreasing mechanism 8 by receiving the liquid surface detection signal S40 from the liquid surface detection unit 40, a flow rate signal S33 from the flow meter 33, and a flow rate signal S37 from the flow meter 37, and applying control signals SC32 and SC36 to the raw material solution increasing/decreasing mechanism 8. The flow rate signal S33 indicates the flow rate of the raw material solution 15 flowing through the raw material solution supply pipe 30A, and the flow rate signal S37 indicates the flow rate of the raw material solution 15 flowing through the raw material solution discharge pipe 30B.

Specifically, the control unit 50 causes the raw material solution increasing/decreasing mechanism 8 to execute the raw material solution supply operation and the raw material solution discharge operation described above such that the level of the liquid surface 15A of the raw material solution 15 in the raw material solution container to be a set liquid level d50, which is a predetermined level.

When the liquid level d15 indicated by the liquid surface detection signal S40 is lower than the set liquid level d50, the control unit 50 applies the control signal SC32 to the suction pump 32, which is the raw material solution supply pump, to operate the suction pump 32, to execute and control the raw material solution supply operation for supplying the raw material solution 15 stored in the raw material tank 35 into the raw material solution container.

When the liquid level d15 indicated by the liquid surface detection signal S40 exceeds the set liquid level d50, the control unit 50 applies the control signal SC36 to the discharge pump 36, which is the raw material solution discharge pump, to operate the discharge pump 36 to execute and control the raw material solution discharge operation for discharging the raw material solution 15 stored in the raw material solution container to the raw material tank 35.

During the raw material solution supply operation, the control unit 50 executes and controls the raw material solution supply operation such that the liquid level d15 of the raw material solution 15 in the raw material solution container rises to the set liquid level d50 while controlling the flow rate of the raw material solution 15 flowing through the raw material solution supply pipe 30A based on the flow rate signal S33.

During the raw material solution discharge operation, the control unit 50 executes and controls the raw material solution discharge operation such that the liquid level d15 of the raw material solution 15 in the raw material solution container falls to the set liquid level d50 while controlling the flow rate of the raw material solution 15 flowing through the raw material solution discharge pipe 30B based on the flow rate signal S37.

In the ultrasonic atomizing device 100 of the present embodiment, the raw material solution increasing/decreasing mechanism 8 is caused to execute the raw material solution supply operation and the raw material solution discharge operation such that the liquid level d15 of the raw material solution 15 to be the set liquid level d50, which is a predetermined level based on the liquid surface detection signal S40 obtained by the liquid surface detection unit 40 under the control of the control unit 50.

As a result, in the ultrasonic atomizing device 100 of the present embodiment, a desired amount of mist of the raw material solution mist MT can be obtained from the raw material solution 15 in the raw material solution container by setting the liquid level d15 of the raw material solution 15 to a fixed set liquid level d50 during atomization operation period in which the raw material solution 15 is dropletized by the ultrasonic vibration of the ultrasonic transducers 2 to obtain the raw material solution mist MT.

In addition, by independently performing the raw material solution supply operation by the suction pump 32 which is the raw material solution supply pump and the raw material solution discharge operation by the discharge pump 36 which is the raw material solution discharge pump, the raw material solution supply operation and the raw material solution discharge operation can be performed with high accuracy.

Further, the ultrasonic atomizing device 100 of the present embodiment adopts a double chamber system including the water tank 10 and the raw material solution container (the atomization container 1 and the separator 12). Therefore, in the ultrasonic atomizing device 100 adopting the double chamber system, the raw material solution mist MT can be obtained from the raw material solution 15 in the raw material solution container with high accuracy.

The ultrasonic atomizing device 100 can transport the generated raw material solution mist MT to the outside with the transport gas G4 alone which is supplied from the gas supply pipe 4 to the raw material solution container.

(Summary of Ultrasonic Atomizing Device 100)

The characteristic parts of the ultrasonic atomizing device 100 of the embodiment illustrated in FIGS. 1 to 7 will be described below.

The relationship between the amount of atomized solution of the raw material solution mist MT and the liquid level d15 has a characteristic as follows. With the optimum liquid level do, which is the level at which the highest amount of mist is obtained, as the peak, the amount of generated mist of the raw material solution mist MT is reduced with the level from the optimum liquid level do changing. Therefore, the amount of mist of the raw material solution mist MT is determined by a negative correlation with the absolute value |d50−d0| of the difference between the set liquid level d50 and the optimum liquid level do.

The optimum liquid level d0 varies depending on the type of raw material solution 15 to be atomized, the type of ultrasonic transmission water 9 for transmitting ultrasonic waves W2, the material and thickness of the separator 12, and the like.

In order to control the amount of mist according to changes in the liquid level d15 with good responsiveness, the accurate detection of the level of the liquid surface 15A of the raw material solution 15 contained in the raw material solution container is significant.

As described above, the liquid surface 15A of the raw material solution 15 in the raw material solution container is prone to fluctuate violently due to the transmission of the ultrasonic waves W2 from the ultrasonic transducers 2.

In the ultrasonic atomizing device 100 of the present embodiment, the raw material solution separation pipe 20 is attached to the side surface of the atomization container 1 in consideration of the above tendency. Compared to the liquid surface 15A of the raw material solution 15 in the raw material solution container to which the ultrasonic wave W2 is transmitted, the liquid surface 15A of the raw material solution 15 in the raw material solution storage space 22 of the raw material solution separation pipe 20, which is not subjected to the ultrasonic waves W2, is stable.

Accordingly, the liquid surface 15A of the raw material solution 15 stored in the raw material solution storage space 22 of the raw material solution separation pipe 20 is stable; therefore, the liquid surface detection unit 40 can accurately recognize the liquid level d15 by detecting the level of the liquid surface 15A of the raw material solution 15 in the raw material solution storage space 22.

In order to change the liquid level d15, a raw material tank 35 is provided independently of the raw material solution container. The raw material solution container and the raw material tank 35 are connected through the raw material solution pipe 30 (the raw material solution supply pipe 30A and the raw material solution discharge pipe 30B). The raw material solution pipe 30 is provided with the raw material solution increasing/decreasing mechanism 8.

When the liquid level d15 is to be raised, the raw material solution increasing/decreasing mechanism 8 is caused to execute the raw material solution supply operation of supplying the raw material solution 15 from the raw material tank 35 to the raw material solution container under the control of the control unit 50. On the other hand, when the liquid level d15 is to be lowered, the raw material solution increasing/decreasing mechanism 8 is caused to execute the raw material solution discharge operation of discharging the raw material solution 15 from the raw material solution container to the raw material tank 35 under the control of the control unit 50. The ultrasonic atomizing device 100 of the present embodiment can control the amount of mist of the raw material solution mist MT by rising/lowering the liquid level d15 with high accuracy.

Although the present disclosure has been described in detail, the foregoing description is, in all aspects, illustrative and not restrictive, and not intended to limit the present disclosure. It is understood that numerous other modification examples not having been described can be devised without departing from the scope of the disclosure.

The invention claimed is:

1. An ultrasonic atomizing device comprising:

a raw material solution container for storing a raw material solution;

an ultrasonic transducer provided below the raw material solution container; and a raw material solution separation pipe provided on a side surface of the raw material solution container and has a raw material solution storage space for storing the raw material solution, wherein the raw material solution separation pipe has a raw material solution passage port for supplying and discharging the raw material solution to and from the raw material solution container, the ultrasonic atomizing device further comprising a liquid surface detection unit configured to detect a liquid level of the raw material solution in the raw material solution storage space;

a raw material tank provided independently of the raw material solution container and for storing the raw material solution; and a raw material solution increasing/decreasing mechanism configured to execute a raw material solution supply operation for supplying the raw material solution stored in the raw material tank into the raw material solution container, and a raw material solution discharging operation for discharging the raw material solution stored in the raw material solution container to the raw material tank, wherein the liquid surface detection unit is configured to output a liquid surface detection signal indicating the liquid level of the raw material solution, the ultrasonic atomizing device further comprising a control unit configured to receive the liquid surface detection signal from the liquid surface detection unit and control the raw material solution increasing/decreasing mechanism, wherein, based on the liquid surface detection signal, the control unit causes the raw material solution increasing/decreasing mechanism to execute the raw material solution supply operation and the raw material solution discharge operation to make the liquid level of the raw material solution reach a predetermined level.

2. The ultrasonic atomizing device according to claim 1, wherein the raw material solution increasing/decreasing mechanism includes a raw material solution supply pump configured to execute the raw material solution supply operation is executed under control of the control unit, and a raw material solution discharge pump configured to execute the raw material solution discharge operation is executed under control of the control unit, and the raw material solution supply pump and the raw material solution discharge pump are provided independently of each other.

3. The ultrasonic atomizing device according to claim 1, wherein the liquid surface detection unit includes a guide probe arranged in a manner as to extend in a height direction in the raw material solution storage space, and a sensor configured to apply a pulsed electric signal to the guide probe and output the liquid surface detection signal based on a reflected signal from the raw material solution.

4. The ultrasonic atomizing device according to claim 1, wherein the liquid surface detection unit includes a guide rod arranged in a manner as to extend in a height direction in the raw material solution storage space, a float that is attached to the guide rod and vertically moves according to the liquid level of the raw material solution, and a sensor configured to detect a position of the float via the guide rod and output the liquid surface detection signal.

5. The ultrasonic atomizing device according to claim 1, wherein the liquid surface detection unit includes a pair of electrodes that are attached to side surfaces of the liquid surface detection unit so as to face each other with the raw material solution storage space interposed therebetween, and a detection circuit electrically connected to the pair of electrodes, and configured to calculate capacitance between the pair of electrodes and output the liquid surface detection signal based on the calculated capacitance.

6. The ultrasonic atomizing device according to claim 1, wherein the raw material solution container has a separator on the bottom surface thereof, the ultrasonic atomizing device further comprising:

a gas supply pipe for supplying a transport gas to the raw material solution container; and a water tank for storing an ultrasonic transmission medium inside, wherein the water tank and the separator are positioned so that the bottom surface of the separator is submerged in the ultrasonic transmission medium, and the ultrasonic transducer is provided on a bottom surface of the water tank positioned below the separator.

* * * * *